United States Patent Office 3,325,557
Patented June 13, 1967

3,325,557
PROCESS FOR THE PRODUCTION OF DIACETYLENE SOLUTIONS
Günter Scharein and Ernst Schwarzberg, Marl, Germany, assignors to Chemische Werke Huls A.G., Marl, Germany
No Drawing. Filed Apr. 12, 1966, Ser. No. 541,980
Claims priority, application Germany, Apr. 13, 1965, C 35,576
16 Claims. (Cl. 260—678)

The invention relates generally to the purification of diacetylene, and more particularly, to the separation of diacetylene from a hydrocarbon mixture containing the same. In one aspect of the invention diacetylene is recovered from a mixture of unsaturated hydrocarbons containing the same; in another aspect of the invention, diacetylene is recovered from the by-product gases of an electric-arc process used in the production of acetylene.

The high chemical reactivity of diacetylene, which is based on its two triple bonds and the two labile hydrogen atoms, makes it a compound of versatility in industrial synthesis. For example, a use of diacetylene is described in the German specification No. 601,822.

Although the high reactivity of diacetylene is desirable, there coexists a tendency for it to react or decompose so rapidly that explosions may occur. To reduce the risk of explosion, it has been suggested to transport diacetylene diluted with stable solvents and to react it in this form (German Patent No. 817,598). The use of such methods in the large-scale production of diacetylene has not, however, entirely eliminated the explosion hazard.

A danger of explosion becomes particularly acute when acetylene homologs are present in a hydrocarbon mixture of diacetylene. Such mixtures are obtained as by-products in the electric-arc process used in the production of acetylene. In this process, the pyrolysis gases discharged from the furnace generally contain as main constituents hydrogen, acetylene, methane, and ethylene.

Other constituents present in low percentages are methyl acetylene, diacetylene, vinyl acetylene, propylene, allene, isobutene, phenyl acetylene, cis-butene-2,3, butadienes, methyl vinyl acetylene, benzene, ethane, propane, isobutane, n-butane, isopentane, n-pentane, carbon monoxide, oxygen, carbon dioxide.

After recovering the acetylene from the pyrolysis gases during the low temperature purification step, the by-product gases containing cyclopentadiene and various acetylene homologs, such as methyl acetylene, vinyl acetylene, phenyl acetylene and triacetylene are used as a source of diacetylene.

In reactions utilizing these gas mixtures as a source of diacetylene, it was thought to be unnecessary to remove the gaseous impurities admixed therewith because of the selective reactivity of diacetylene. It has been found, however, that the acetylene homologs under those conditions wherein diacetylene is reacted, e.g. at high temperatures and in alkaline solutions readily polymerize to form explosive polymerizates. Those conditions also promote the polymerization of cyclopentadiene which produces an undesirable equilibrium shift in the reaction system.

It is therefore a principal object of the invention to provide a process for the separation of diacetylene from a hydrocarbon mixture containing the same.

It is another object of the invention to provide a process of recovering diacetylene in relatively pure form from by-product gases obtained in the electric-arc process used in producing acetylene.

Still another object of the invention is to provide an improved process of removing diacetylene as an alcoholic solution from pyrolysis gases containing polymerizable compounds.

To attain the above objectives, it has been surprisingly discovered that diacetylene can be separated from a mixture of pentadiene and acetylene homologs by the following process which comprises:

(A) Combining the diacetylene mixture at 10 to 30° C. with 10 to 30 times as much of hydrocarbon having a boiling temperature of 200–400° C.;

(B) Passing into resultant liquid mixture of step (A) a gaseous hydrocarbon of preferably 1 to 4 carbon atoms, said gaseous hydrocarbon being at a temperature of 80 to 120° C.; and forming gaseous effluent;

(C) Cooling at least a portion of said gaseous effluent from the preceding step (B) to a temperature of −30 to 0° C.; and (D) Contacting resultant cooled gases of step (C) with monovalent aliphatic alcohols containing 1 to 6 carbon atoms, said alcohols being at a temperature of −40 to −10° C., to recover diacetylene substantially free of undesired impurities in an alcoholic solution.

The diacetylene-containing feed treated in accordance with the invention is usually constituted of by-product gases from processes used in the production of acetylene such as the electric-arc process and Wulff process.

These aforementioned processes used for the production of acetylene also yield various proportions of acetylene homologs, diacetylene, and other hydrocarbons which are referred to hereinafter as diacetylene-containing by-products.

Acetylene homologs include, for example methyl acetylene, vinyl acetylene, phenylacetylene, and triacetylene.

Upon recovery of acetylene and if desired other valuable products, 1 part by weight of the diacetylene-containing by-product is desirably mixed with 10 to 30, preferably 15 to 25 parts by weight of hydrocarbon mixture at a temperature of 10 to 30, preferably 15 to 25° C. The liquid hydrocarbon mixture, acting as a solvent for the by-products, desirably has a normal boiling point of 200 to 400, preferably 250 to 350° C. Suitable hydrocarbons include diesel oils or other mixtures consisting of hydrocarbons having 10 to 20 carbon atoms.

The described liquid hydrocarbons and the described cooled liquid pyrolysis by-products are mixed quantitatively, the resultant liquid mixture containing diacetylene and its by-products in a percentage depending on the applied quantity of diesel oil or other liquid hydrocarbons.

The hydrocarbon mixture containing the by-products is then degasified by contact with a gaseous hydrocarbon having 1 to 4, preferably 1 to 2 carbon atoms. In practice, 50 to 300, preferably 100 to 200 volumes of the gaseous hydrocarbon, at a temperature of 80 to 120, preferably 100° C., are used per volume of liquid hydrocarbon mixture. Owing to the variation in the capacity of the liquid hydrocarbons used to dissolve the by-products, it is desirable to base the amount of gaseous hydrocarbon employed on the amount of by-products in the liquid hydrocarbon. In this connection, it is preferred to employ 2 to 6 parts by weight of the gaseous hydrocarbon per part by weight of by-product in the liquid hydrocarbon.

Advantageously, saturated aliphatic hydrocarbons such as methane, ethane, or mixtures thereof are employed in the degasification step. Also suitable are ethylene, propylene, butylene, isobutylene.

To increase the rate of mass transfer the gaseous hydrocarbon is advantageously passed countercurrently to the liquid hydrocarbon mixture in a packed column. Alternatively, the gaseous hydrocarbon can be simply bubbled through the liquid mixture to obtain an effluent gas containing the diacetylene. Regardless of which method of degasification is used, it is preferable to maintain the gas-liquid contact for a period sufficient to bring the concentration of diacetylene in the gaseous effluent to about 1 to 3 volume percent. To minimize the risk of producing an explosive mixture, the gas-liquid contact time, however, should be regulated so as not to increase the concentration of diacetylene in the gaseous effluent above 3 volume percent, said gaseous effluent generally comprises:

TABLE.—COMPOSITION OF THE GASEOUS EFFLUENT AFTER THE DEGASIFICATION STEP

| | |
|---|---|
| Methane | 22.0–26.0 |
| Acetylene | 0.5–2.0 |
| Carbon monoxide and nitrogen | 0.5–4.0 |
| Ethylene | 0.5–3.0 |
| Ethane | 30.0–45.0 |
| Methyl acetylene | 1.0–3.0 |
| Propylene | 3.0–7.0 |
| Propane | 5.0–9.0 |
| Diacetylene | 1.0–3.0 |
| Vinyl acetylene | 1.0–3.0 |
| Butadienes | 0.5–1.0 |
| Butenes | 1.0–2.0 |
| Butane | 1.0–6.0 |

The gaseous effluent is then passed through a heat exchanger and cooled to −30 to 0° C., preferably −20 to −10° C., cooling being desirable because of the increased selectivity of the solvent employed in the subsequent step for the diacetylene at these lower temperatures. Cooling is preferably effected in a heat exchanger consisting of tubes, the heat exchanging medium being evaporating ammonia.

After being cooled, the gaseous effluent is passed into contact with a monovalent aliphatic alcohol, cooled to about −40 to −10° C., preferably −15 to −20° C. which is a selective solvent for diacetylene. In commercial installations, the gaseous effluent is passed countercurrently to the alcohol solvent in a packed tower. However, any of the conventional gas-liquid contact systems can be employed with satisfactory results.

The resulting alcoholic solution contains 7 to 10 percent by weight of diacetylene and traces of vinyl acetylene, butene, and butane. In the gaseous hydrocarbon remain acetylene, methyl acetylene, propylene, and butadienes.

The gaseous hydrocarbon is recycled to the furnace. The gaseous hydrocarbon applied in the degasification step of this invention is available as a waste product in the first purification step applied to the pyrolysis gases discharged from the furnace.

Suitable monovalent aliphatic alcohols which can be used include methanol, ethanol, isopropanol, n-propanol, butanol, pentanol, hexanols.

The alcohols act as a selective solvent for diacetylene at the selected temperature range.

The alcohol solution of diacetylene obtained by the process of the invention is substantially free of undesired polymerizable materials and, in the alcohol solution, the diacetylene is safe to handle. It is, however, desirable to use enough alcohol solvent to produce a final solution containing no more than 7 to 10% by weight of diacetylene.

The alcohol solution can be treated to remove the diacetylene therein for separate use or else, the solution form can be conveniently used. For example, methanolic diacetylene solutions can be used in the synthesis of methoxybutenyne, an important intermediate product in the production of vitamin A.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example*

650 kg. condensate from a low-temperature cooling plant used in the production of acetylene containing about 20% by weight of diacetylene, 12% by weight of methyl acetylene, 20% by weight of monovinyl acetylene, 10% by weight of cyclopentadiene, 0.5% by weight of triacetylene, and 0.5% by weight of phenyl acetylene is mixed, at 20° C., with twenty times the amount (13,000 kg.) of the Shell oil (boiling point range 270–330° C.). 2,400 Nm.$^3$ of low-molecular hydrocarbons (ca. 60% by weight methane, 35% by weight ethane, the rest being propane, propene, butane, butenes) heated to 100° C., was then passed countercurrent to the resulting liquid hydrocarbons in a packed tower. Of the total gas charged, 180 Nm.$^3$/h. are passed through a washing device filled with Raschig rings and, after cooling to −15° C., washed countercurrently with 36 kg./h. of methanol [cooled to −25° C.]. There are obtained 70 kg. of a methanolic diacetylene solution which is substantially free of the above-mentioned by-products and can be safely handled.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the production of a stable solution of diacetylene from a feed mixture containing diacetylene and acetylene homologs, said process comprising:
   (A) mixing said feed at a temperature of 10–30° C. with a liquid hydrocarbon mixture having a normal boiling temperature of 200–400° C.;
   (B) contacting resultant liquid hydrocarbon mixture from step (A) with gaseous hydrocarbon, said gaseous hydrocarbon being at 80 to 120° C. to degasify said liquid hydrocarbon mixture and remove diacetylene therefrom in a gaseous effluent;
   (C) cooling resultant gaseous hydrocarbon effluent to a temperature of −30 to 0° C.; and
   (D) contacting resultant cooled gaseous effluent with a monovalent aliphatic alcohol cooled to a temperature of −40 to −10° C. to selectively dissolve the diacetylene in said alcohol.

2. A process as defined by claim 1 wherein said feed mixture contains pentadiene.

3. A process as defined by claim 2 wherein there is used 10 to 30 parts by weight of liquid hydrocarbon mixture per part by weight of feed mixture.

4. A process as defined by claim 2 wherein said liquid hydrocarbon mixture is selected from the group consisting of diesel oils.

5. A process as defined by claim 2 wherein said gaseous hydrocarbon is an alkane of 1 to 4 carbon atoms.

6. A process as defined by claim 2 wherein said monovalent aliphatic alcohol contains 1 to 6 carbon atoms.

7. A process as defined by claim 2 wherein said alcohol is selected from the group consisting of methanol, ethanol, n-propanol, isopropanol, butanols, pentanols, and hexanols.

8. In a process for the production of a stable solution of diacetylene from a feed mixture containing diacetylene and acetylene homologs, the step which comprises:
   (A) mixing one part by weight of said feed at a temperature of 10–30° C. with 10–30 parts by weight of a liquid hydrocarbon mixture having a normal boiling temperature of 200–400° C.

9. The process of claim 8 further characterized in that (B) resultant liquid hydrocarbon mixture from step (A) is contacted with gaseous hydrocarbon of 1–4 carbon atoms, said gaseous hydrocarbon being at 80 to 120° C., thereby to degasify said liquid hydrocarbon mixture and remove diacetylene therefrom in a gaseous effluent, the volumetric ratio of said gaseous hydrocarbon to said liquid hydrocarbon mixture being 50:1 to 300:1, respectively.

10. The process of claim 9 further characterized in that resultant hydrocarbon effluent from step (B) is cooled to a temperature of $-30°$ to $0°$ C.; and thereafter contacted with a monovalent aliphatic alcohol cooled to a temperature of $-40$ to $-10°$ C. to selectively dissolve the diacetylene in said alcohol.

11. A stable solution consisting essentially of 7–10% by weight of diacetylene in a monohydric alkanol of 1–6 carbon atoms.

12. A stable liquid at 10–30° C. comprising 1 part by weight of diacetylene containing by-product from an acetylene process after removal of acetylene and 10–30 parts by weight of a liquid hydrocarbon mixture having a normal boiling temperature of 200–400° C.

13. A stable gaseous mixture comprising, by volume, 1–3% diacetylene, and a major amount of an alkane of 1 to 2 carbon atoms.

14. In a process for the production of a stable solution of diacetylene, the process comprising, contacting a liquid mixture of diacetylene and liquid hydrocarbon having a normal boiling temperature of 200–400 °C. with a gaseous alkane of 1–4 carbon atoms to separate said diacetylene from said liquid hydrocarbon.

15. In a process for the production of a stable solution of diacetylene, the process comprising: contacting a gaseous mixture comprising 1–3% by volume of diacetylene and a major amount of an alkane of 1–4 carbon atoms, said mixture being at $-30°$ to $0°$ C., with a sufficient quantity of a monovalent aliphatic alcohol to transfer diacetylene into said alcohol, said aliphatic alcohol being at $-40°$ to $-10°$ C., the weight percent of diacetylene in the alcohol being 7–10%.

16. In a process for the production of acetylene by the electric-arc process which comprises the steps of passing an electric arc through hydrocarbons to obtain pyrolysis gases containing acetylene, diacetylene and acetylene homologs, and cooling the pyrolysis gases to a temperature between the boiling point of the acetylene and the boiling point of diacetylene thereby to liquefy and separate the diacetylene and acetylene homologs from acetylene, the improvement which comprises: contacting the pyrolysis gases from which acetylene has been removed at a temperature of 10–30° C. with a liquid hydrocarbon having a normal boiling point of 200–400° C., contacting resultant liquid hydrocarbon mixture with gaseous hydrocarbon, said gaseous hydrocarbon being at 80 to 120° C. to degasify said liquid hydrocarbon mixture and remove diacetylene therefrom in a gaseous effluent, cooling resultant gaseous hydrocarbon effluent to a temperature of $-30$ to $0°$ C.; and contacting resultant cooled gaseous effluent with a monovalent aliphatic alcohol cooled to a temperature of $-40$ to $-10°$ C. to selectively dissolve the diacetylene in said alcohol.

References Cited

UNITED STATES PATENTS

| | | | |
|---|---|---|---|
| 1,096,797 | 5/1914 | Snelling | 206—.7 |
| 2,925,385 | 2/1960 | Winnacker et al. | 206—.7 |
| 3,117,167 | 1/1964 | Burch et al. | 260—679 |

FOREIGN PATENTS

| | | |
|---|---|---|
| 740,637 | 11/1943 | Germany. |
| 860,212 | 12/1952 | Germany. |
| 875,507 | 5/1953 | Germany. |

DELBERT E. GANTZ, *Primary Examiner.*

ALPHONSO D. SULLIVAN, *Examiner.*